United States Patent [19]

Yoshida et al.

[11] Patent Number: 5,123,783
[45] Date of Patent: Jun. 23, 1992

[54] METHOD OF REUSING SLURRY

[75] Inventors: Hiroshi Yoshida; Takanori Tsutaoka, both of Tokyo; Toshio Imai, Toda; Masahiro Yoshihara, Tokyo; Mitsuhiro Shibazaki, Tokyo; Hiroaki Kubo, Tokyo; Toshitsugu Jinbo, Tokyo; Hiroshi Miyazaki, Takarazuka, all of Japan

[73] Assignees: Kajima Corp.; NEC Corp.; Sumitomo Cement Kabushiki Kaisha; Chemical Grouting Co., Ltd., all of Tokyo; Shoei Yakuhin Kabushiki Kaisha, Osaka, all of Japan

[21] Appl. No.: 689,053
[22] PCT Filed: Aug. 30, 1990
[86] PCT No.: PCT/JP90/01100
  § 371 Date: Jun. 28, 1991
  § 102(e) Date: Jun. 28, 1991
[87] PCT Pub. No.: WO91/03605
  PCT Pub. Date: Mar. 21, 1991

[30] Foreign Application Priority Data

Aug. 30, 1989 [JP]  Japan ................... 1-221676

[51] Int. Cl.$^5$ ............................. E02D 3/12
[52] U.S. Cl. ..................... 405/263; 405/264; 405/266
[58] Field of Search ............... 405/263, 264, 265, 266, 405/258; 166/293, 285

[56] References Cited

U.S. PATENT DOCUMENTS

| 4,715,746 | 12/1987 | Mann et al. | 405/264 |
| 4,971,480 | 11/1990 | Nakanishi | 405/269 |
| 5,006,017 | 4/1991 | Yoshida et al. | 405/263 |
| 5,026,215 | 6/1991 | Clarke | 405/266 |

Primary Examiner—Dennis L. Taylor
Attorney, Agent, or Firm—Armstrong & Kubovcik

[57] ABSTRACT

A method of reusing a slurry in a ground improving method, wherein a hardening agent is injected into the ground, and wherein the muddy water (i.e., the slurry which is discharged) upon working is regenerated and again used as an injection material; namely, a hardening agent. By measuring the physical amount indicative of the permeability characteristic of the hardening agent contained in the slurry, an amount of hardening agent contained in the collected slurry (i.e., an amount of hardening agent to be collected) is calculated. Since the amount of collected hardening agent is calculated simultaneously with the collection of the slurry, the amount of hardening agent to be newly injected can be controlled in a real-time manner on the basis of the latest data (i.e., numerical value).

1 Claim, 4 Drawing Sheets

| SAMPLE NO. | DETECTED CEMENT AMOUNT | | ERROR (%) |
|---|---|---|---|
| | MEASUREMENT OF PERMEABILITY | CHEMICAL ANALYSIS | |
| FC-1 | 221 | 200 | 10.5 |
| FC-2 | 340 | 343 | -0.9 |
| FC-3 | 374 | 340 | 10.0 |
| FC-4 | 269 | 316 | -14.9 |
| FC-5 | 374 | 332 | 11.2 |
| AVERAGE | 316 | 306 | 3.2 |

Fig. 5

| SAMPLE NO. | UNIAXIAL COMPRESSION STRENGTH | | | | | | AVERAGE |
|---|---|---|---|---|---|---|---|
| | UPPER PORTION | | MIDDLE PORTION | | LOWER PORTION | | |
| 1 | 176 | | 223 | | 216 | | |
| 2 | 160 | 159 | 183 | 194 | 154 | 180 | 178 |
| 3 | 140 | | 176 | | 169 | | |

Fig. 6

METHOD OF REUSING SLURRY

BACKGROUND OF THE INVENTION

1. Field of the Invention

This invention relates to a method of reusing a slurry in a ground improving method, wherein a hardening agent is injected into the ground, and wherein muddy water; i.e., slurry which is discharged upon working thereof is regenerated and again used as an injection material; namely, a hardening agent.

2. Discussion of the Relevant Art

In the above-discussed method of reusing slurry, with respect to the hardening agent which is injected into the ground, the hardening agent of a quantity which is equal to or larger than the amount corresponding to the volume of a hole dug in the ground and gaps in the ground are discharged as slurry onto the ground. The slurry which is discharged onto the ground is at present abandoned as industrial waste. A discharge amount of the slurry differs depending on the kind of the ground improving method being employed. In addition, the content of sediment in the discharged slurry also differs depending on the working condition and working method being employed.

However, the process for abandoning the slurry as industrial waste causes an increase in processing cost. In addition, a present situation wherein the decrease in the number of construction for processing facilities of the industrial wastes facilitates an increase in processing cost. Therefore, there is a strong demand for reusing the slurry for the hardening agent contained in the slurry.

When reusing the slurry, a technique for measuring a quantity of hardening agent contained in the discharged slurry is inevitable. Techniques for measuring an amount of hardening agent contained in the slurry includes a calcium analysis method, a pH measuring method and a boron tracer.

The calcium analysis method is a method whereby after an amount of calcium in a consolidation sample is measured, a calcium element component of the hardening agent is counted back and a content of the hardening agent is obtained from the calcium element component. However, the above method has a problem in that a fairly large amount of labor is expended to measure the content.

The pH measuring method estimates a range of an amount of hardening agent on the basis of the numerical value obtained from the working processes (i.e., actual results) from an alkalinity (pH) which the hardening agent liquates and physical properties (i.e., specific gravity or the like) of the discharged slurry. However, according to this method, since the numerical values obtained from the actual results are used, there is a problem in that the latest information cannot be obtained on every ground.

The boron tracer method is a method whereby by using the principle in which boron atoms absorb the neutrons, boron atoms are mixed into the hardening agent so as to keep a concentration of boron atoms constant, the number of boron atoms is measured, and thereby, obtaining a quantity of hardening agent. This method has an advantage in that the quantitative measurement of the hardening agent can be performed. However, there is a problem in that a radioactive isotope (RI) must be used upon measurement.

The present invention is made in consideration of the problems of the conventional techniques mentioned above, and it is an object of this invention to provide a method for reusing a slurry in the ground, wherein a quantity of the hardening agent contained in a discharged slurry can be accurately and suitably measured and the demand to reuse the slurry (i.e., the hardening agent contained in the slurry) can be satisfied.

SUMMARY OF THE INVENTION

This invention relates to a method of reusing a slurry in a ground improving method, wherein a hardening agent is injected into the ground. The method comprises the steps of adding a material having a permeability into the hardening agent to be injected, measuring a physical amount indicative of a permeability characteristic of the hardening agent added with the substance, and calculating an amount of hardening agent from the physical amount. The method further includes the steps of: collecting the slurry which is discharged upon execution of the ground improving method; measuring the physical amount in the collected slurry and calculating an amount of collected hardening agent; and calculating a difference between an injection amount of the hardening agent which is needed to improve the ground and the collected amount of hardening agent and injecting the hardening agent of the amount corresponding to the difference.

In this invention, it is preferable to use cement as a hardening agent and to use ferrite as a material having the permeability.

It is now assumed that a grain diameter of a cement particle is set to $d_a$, a grain diameter of a ferrite particle is set to $d_b$, a specific gravity of a cement particle is set to $\delta_a$, a specific gravity of a ferrite particle is set to $\delta_b$, and a specific gravity of the suspension of cement and ferrite is set to $\delta_s$. It is now preferable to select the cement particles and the ferrite particles so as to conform to the following equation:

$$\frac{d_b}{d_a} = \sqrt{\frac{\delta_a - \delta_s}{\delta_b - \delta_s}}$$

This is because cement and ferrite perform the same motion in the mixture and a distribution ratio in the mixture is set at a constant value and the content of the cement in the slurry can be accurately calculated.

According to this invention, having the above-discussed construction, by collecting the discharged slurry and measuring the physical amount indicative of the permeability characteristic of the hardening agent contained in the slurry, an amount of hardening agent contained in the collected slurry; i.e., an amount of hardening agent to be collected is calculated. By comparing an amount of hardening agent which is needed to improve the ground and has previously been known, and the amount of collected hardening agent and by obtaining the difference therebetween, the amount of hardening agent to be newly injected is calculated.

As mentioned above, according to this invention, since the amount collected hardening agent is simultaneously calculated with the collection of the slurry, the amount of hardening agent to be newly injected can be controlled in a real-time manner on the basis of the latest data (i.e., numerical value). Thus, the slurry can be used again in a fully automated system.

In this invention, a material having the permeability is used as a tracer and the material having the permeability is harmless for the human body as compared with a radioactive material or the like. In addition, since the hardening agent is used again, an amount of hardening material to be processed as an industrial waste decreases. Therefore, according to the operation of this invention, the generation of public pollution can be also suppressed.

On the other hand, by properly selecting an additive material having the permeability, the motions of the additive material and the hardening agent can be made coincident so that the calculated amount of the collected hardening agent also has an accurate numerical value.

These and other features of this invention will be understood upon reading of the following description along with the drawings.

BRIEF DESCRIPTION OF THE DRAWINGS

FIG. 5 is a diagram showing a table of the accuracies of the results of the measurements which were measured in accordance with the measurements which were measured in accordance with the measurement principle of the present invention; and FIG. 6 is a diagram showing a table of the strengths of respective portions of the columnar consolidation bodies constructed in accordance with the present invention.

DETAILED DESCRIPTION OF THE PREFERRED EMBODIMENTS

Figure 1:
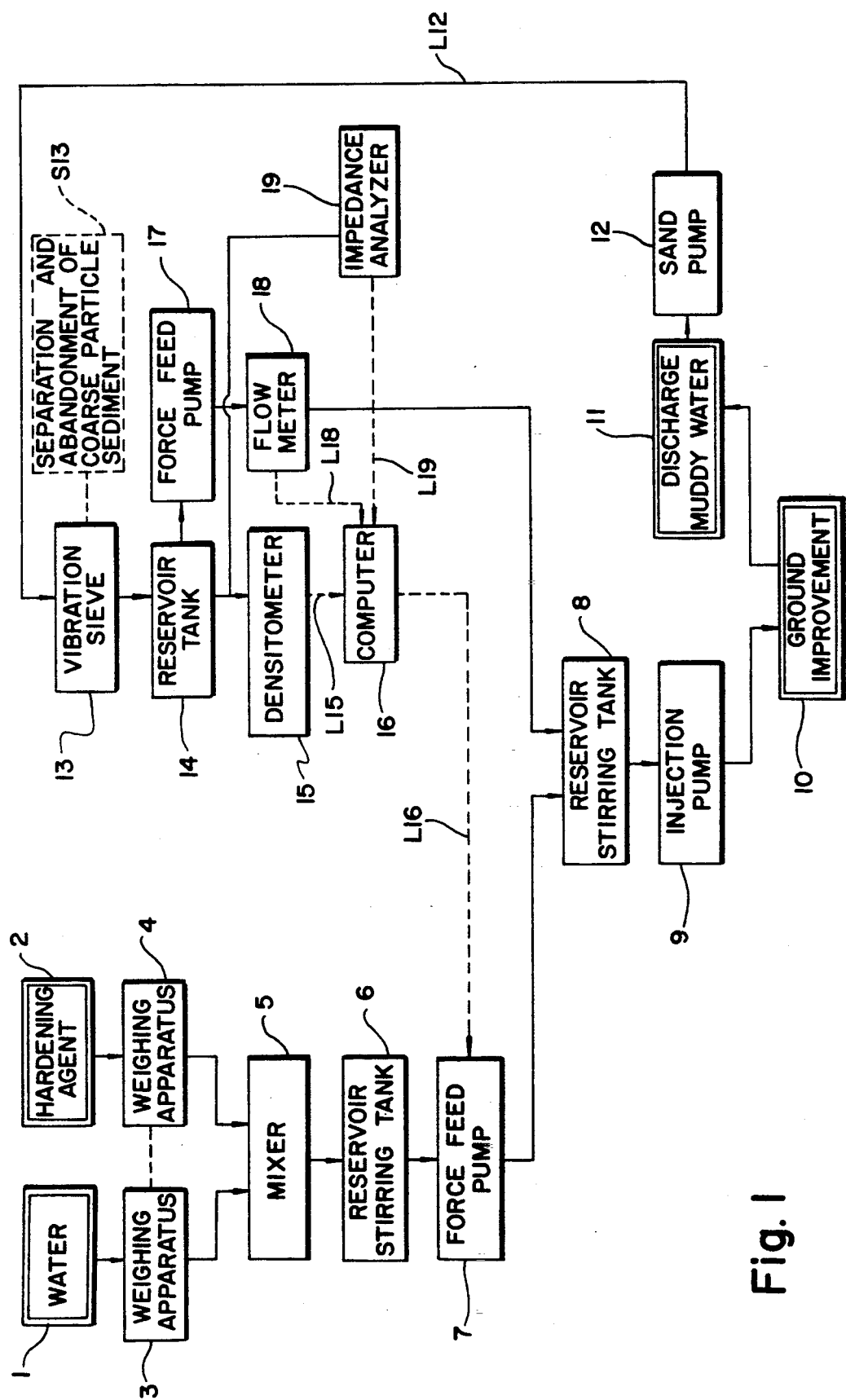
FIG. 1 is a block diagram showing a procedure of an embodiment of the present invention.

FIG. 1 shows an outline of an embodiment to which the invention is applied in what is called a column jet grouting method. After a hardening agent 2 comprising water 1 and cement is measured by weighing apparatuses 3 and 4, respectively, it is injected into a mixer 5 and mixed and stirred. The stirred material of the water and hardening agent is transferred into a first reservoir stirring tank 6 and properly stirred. In this stirring state, the stirred material is held in a state suitable for the ground improving work. Magnetic particles are uniformly mixed in the hardening agent 2.

When executing the ground improving work, the stirred material of the water and hardening agent is first fed into a second reservoir stirring tank 8 by a force feed pump 7 and is subsequently sent to a ground improvement working site 10 by an injection pump 9. In the ground improvement working site 10, a hole is dug in the ground, the stirred material of the water and hardening agent is spouted out into the hole, and a columnar consolidation body is formed.

The stirred material which is not used to construct the columnar consolidation body is discharged as a discharge muddy water or slurry 11 together with the sediment at the working site from the hole dug in the working site. The slurry 11 is sent to a hardening agent collecting step (line $L_{12}$) by a sand pump 12. The coarse particle sediment contained in the slurry which is sent through the line $L_{12}$ is separated by a vibration sieve 13 and discharged so that the slurry is set into a state in which it can be used again (step $S_{12}$).

The slurry from which the coarse particle sediment is separated from and which can be used again is sent to a reservoir tank 14 and its density is measured in the reservoir tank by a densitometer 15. The measured density is inputted to a computer 16 (line $L_{15}$). On the other hand, the reusable slurry is sent from the reservoir tank 14 into the second reservoir stirring tank 8 through a flow meter 18 by a force feed pump 17. At this time, a flow amount of the reusable slurry which was measured by the flow meter 18 is inputted to the computer 16 (line $L_{18}$). An impedance as a physical amount indicative of the permeability characteristic of the hardening agent contained in the reusable slurry is measured by an impedance analyzer 19 and inputted to the computer 16 (line $L_{19}$).

When the density, flow amount, and impedance of the reusable slurry are inputted to the computer 16, the computer calculates the amount of hardening agent contained in the slurry; i.e., the amount of hardening agent collected from those measured values. A difference between the amount of hardening agent which is needed for the ground improving work and the amount of collected hardening agent is calculated by the computer 16 and a control signal is transmitted from the computer 16 to the force feed pump 7 so as to supply the hardening agent of the amount corresponding to the calculated difference from the first reservoir stirring tank 6 (line $L_{16}$). Thus, the amount of collected hardening agent is obtained in a real-time manner and the hardening agent of the amount which is necessary and enough for the ground improving work is accurately supplied.

Figure 2:
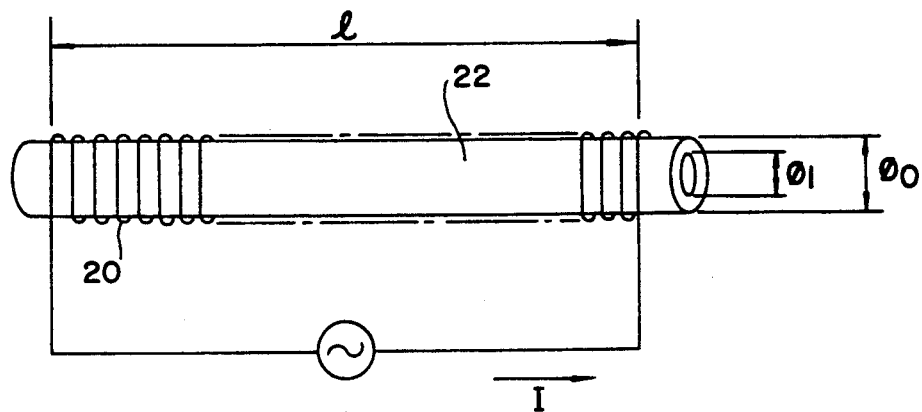
FIG. 2 is an explanatory diagram of the measurement principle in the present in invention.

The principle in which the impedance exhibits the permeability characteristic of the hardening agent will now be described with reference to FIG. 2. FIG. 2 shows a state in which a magnetic material 22 is inserted into a hollow coil 20.

An impedance $Z_0$ of the hollow coil 20 is given by the following equation:

$$Z_0 = R_0 + j\omega L_0.$$

When it is assumed that an inductance is set to $L_0$, an internal resistance is set to $R_0$, and a pure imaginary number is set to j.

When a permeability of the magnetic material 22 assumes $\mu$ and the magnetic material 22 is inserted into the hollow coil 20, an impedance $Z_1$ of the coil is given by the following equations:

$$Z_1 = R_0 + \omega L_0(S_1/S_0)\mu_B + \{j\omega L_0(S_0 - S_1 + \mu_A S_1)\}/S_0\}$$

where, $\mu_A$ is a real number part of the permeability $\mu$ and $\mu_B$ is an imaginary number part of the permeability $\mu$. That is, the permeability $\mu$ is expressed by the equation:

$$\mu = \mu_A - j\mu_B$$

On the other hand, the impedance $Z_1$ of the coil when the magnetic material 22 is inserted into the hollow coil 20 is expressed by the equation:

$$Z_1 = R_1 + j\omega L_1.$$

Therefore, $$R_1 = R_0 + \omega L_0(S_1/S_0)\mu_B; \text{ and}$$

$$L_1 = L_0(S_0 - S_1 + \mu S_1)/S_0.$$

By deriving $\mu_A$ and $\mu_B$ from the above two equations, respectively, $$\mu_A = (S_0/S_1)\{(L_1/L_0) -\} + 1; \text{ and}$$

$$\mu_B = (S_0/S_1)\{(R_1 - R_0)/\omega L_0\}.$$

Therefore, the permeability $\mu$ of the magnetic material 22 can be obtained if the impedance $Z_1$ and a resistance of the coil in the hollow state in which the magnetic material 22 is not inserted and an impedance $Z_O$ and a resistance of the coil in a state in which the magnetic material 22 is inserted are known. In this case, if a substance comprising a material having no magnetic loss until a high frequency range is used as a magnetic material 22, $\mu_B = 0$ and only $\mu A$ exists at the measuring frequency. Therefore, if a change in inductance of the coil is known, the permeability $\mu$ of the magnetic material 22 is obtained.

In the case where the magnetic particles are mixed and distributed into a non-magnetic material, the permeability of the mixture changes depending on a concentration of magnetic material. If the permeability of the mixture is known, an amount of magnetic material can be known. In this invention, since the magnetic material is uniformly mixed into hardening agent at a predetermined ratio, the amount of magnetic material is proportional to the amount of hardening agent. Therefore, the amount of hardening agent can be obtained if the amount of magnetic material is known from the permeability of the mixture.

Figure 3:
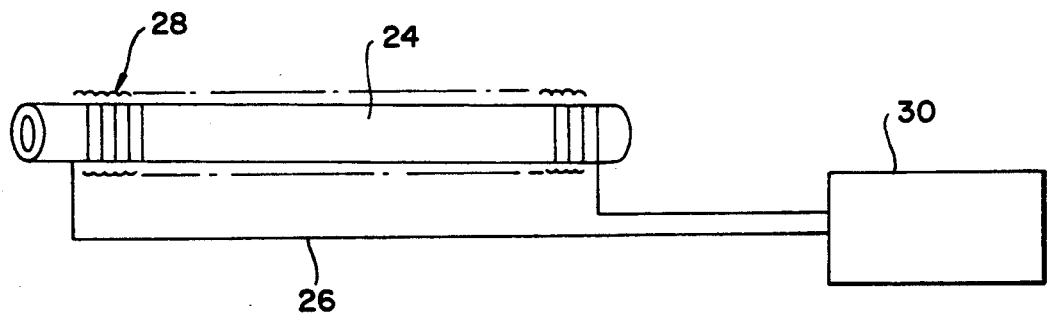
FIG. 3 is an explanatory diagram of a measuring apparatus which is used in the present invention.

FIG. 3 shows an example of an apparatus for measuring a permeability in the invention. In FIG. 3, a coil 28 is formed by winding a covered copper wire 26 around a glass tube 24 and the collected slurry (not shown in FIG. 3) is allowed to flow in the glass tube 24. An inductance of the coil 28 is measured by an impedance analyzer 30. The permeability of the slurry flowing in the glass tube 24 can be obtained on the basis of the foregoing principle.

Figure 4:
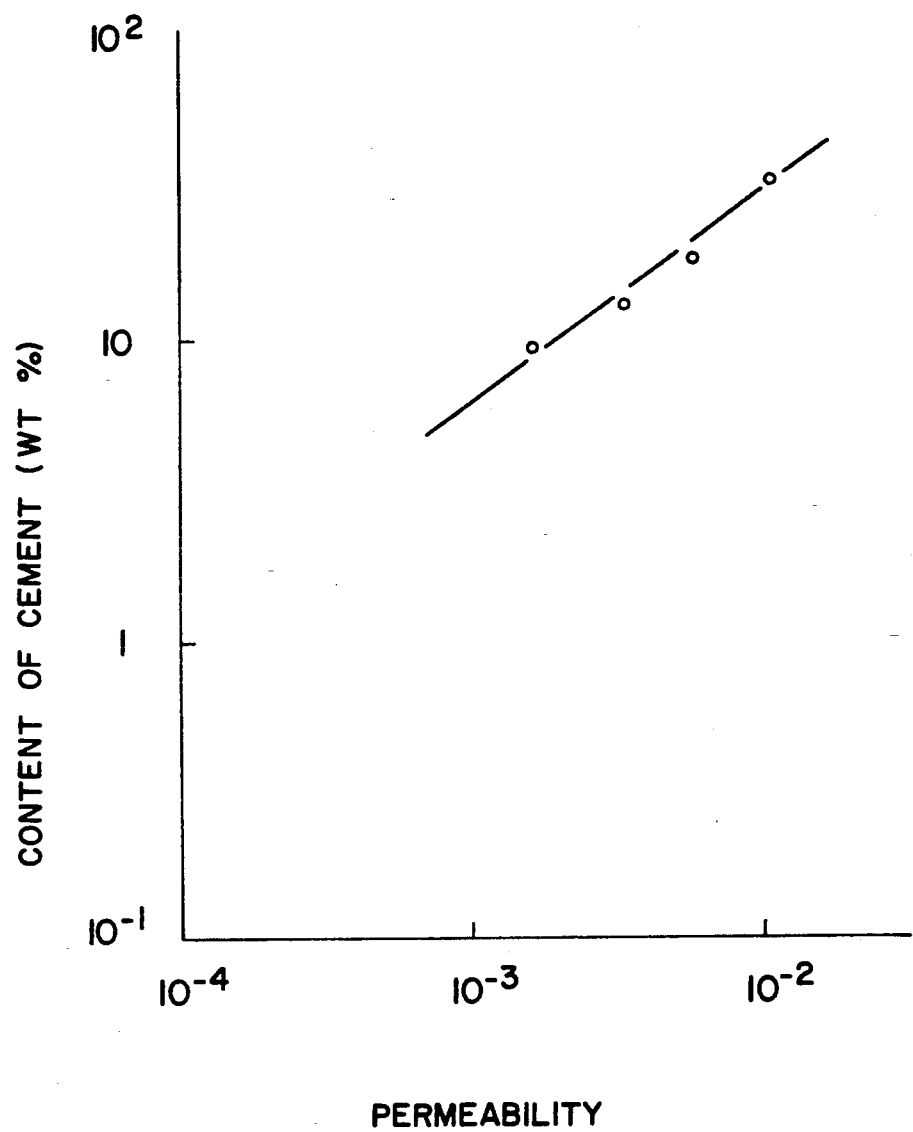
FIG. 4 is a characteristic graph showing permeabilities and contents of cement which were measured by using the measuring apparatus of FIG. 3.

FIG. 4 shows the results of the measurements in the detection of the concentration of ferrite cement in the case where a mixture of the water and ferrite cement which is obtained by mixing the ferrite particles having an average grain diameter of 2.5 $\mu$m into 5 weight % of cement (an average grain diameter being 15 $\mu$m) is allowed to flow into the glass tube 24 in place of the slurry and the concentration of ferrite cement is variously changed. As will be understood from FIG. 4, the permeability changes in proportion to the concentration of the ferrite cement, and if the permeability is known, the concentration (namely, the content of ferrite cement) is obtained.

In order to obtain the content of the hardening agent (i.e., the ferrite cement) from the permeability, it is necessary that the magnetic particles as a tracer are uniformly mixed into the hardening agent as a non-magnetic material and that when the hardening agent is diluted by the water or the like, the magnetic material and the hardening agent perform the same motion. In other words, in the case where the magnetic particles precipitate in the hardening agent or the magnetic particles are separated from the hardening agent, the proportional relation between the permeability and the content of the hardening agent is not satisfied and the invention cannot be embodied. The conditions in which the magnetic particle and the hardening agent perform the same motion will now be described hereinbelow. It is now assumed that cement is used as a hardening agent and ferrite is used as a magnetic particle.

In the interference drop in which a number of particles drop while exerting influences on each other in the suspension, and in a range where Stokes' law is satisfied, a drop velocity $V_s$ of the particle is given by the following equation:

$$V_S = \{(\delta - \delta_s)d^2\}/(18n_s),$$

where $\delta$ is a specific gravity of the particle, $\delta_2$ is a specific gravity of suspension, d is a diameter of particle, and $\delta_s$ denotes a viscosity of suspension.

For instance, in the particles (such as, cement and ferrite) having specific gravities which differ, the particles having the equal drop velocity are called uniform speed drop particles and a ratio of sizes of the uniform velocity drop particles is called a uniform velocity drop ratio. The uniform velocity drop ratio is given by the following equation:

$$\frac{d_b}{d_a} = \sqrt{\frac{\delta_a - \delta_s}{\delta_b - \delta_s}},$$

where $d_a$ and $d_b$ denote diameters of two kinds of particles and $\delta_a$ and $\delta_b$ indicate specific gravities of two kinds of particles.

By selecting cement and ferrite which satisfy the condition which is given by the above equation, both cement and ferrite perform the same motion in the suspension; i.e., mixture fluid. However, since there is a variation in grain diameters of the actual particles, to meet the condition of the above equation, it is preferable that the grain diameter of the particle having a larger specific gravity is set to be smaller than the numerical value which is obtained from the above equation.

Explanation will now be provided with respect to the comparison of measurements in the case where ferrite cement of 5 weight % is used as a hardening agent mixed with the magnetic particles and the permeability of the discharged slime having been obtained, and the amount of collected cement being measured due to the embodiment shown in FIG. 1 and the results of the measurements in the case where a CaO quantity having been obtained by the chemical analysis and the amount of collected cement being measured from the CaO quantity. The test conditions are set as follows. A ferrite concentration is set to 5 weight %. An average grain diameter of ferrite is set to 2.4 $\mu$m. A length (column length) of columnar consolidation body which is formed by the ground improving work is set to 4 m. An injection agent concentration (W/C) is set to 100%. A nozzle pull-up velocity in the ground improving work is set to 5 cm/min.

As can be understood from FIG. 5, the results of the measurements of the amount of cement, according to the embodiment shown in FIG. 1, exhibits only an error of about 10% as compared with the results of the measurements by the chemical analysis. Therefore, it will be understood that when the invention is embodied, the amount of collected cement is accurately calculated.

FIG. 6 shows the results of the strength tests of the columnar consolidation bodies constructed by using the slurry (i.e., hardening agent contained therein) which is reused according to this invention.

As can be seen from the results of the strength tests, it will be understood that the columnar consolidation bodies constructed by the above-described embodiments of this invention have the uniform strength and extremely good strength characteristics.

As described above, according to this invention, an amount of hardening agent contained in the discharged slurry is accurately calculated in a real-time manner and the difference between the amount of hardening agent which is needed for the ground improving work and the amount of collected hardening agent is soon obtained. Therefore, the hardening agent is effectively used and an amount of hardening agent to be abandoned is remarkably reduced. Further, the reuse of slurry or the reuse of cement contained in the slurry can be performed in a fully automated system.

On the other hand, since the magnetic particles have been used as a tracer, the tracer does not exert an adverse influence on the human body and does not become a cause of public pollution.

Further, the columnar consolidation body constructed by the embodiments of this invention has a uniform strength as a whole and has good strength characteristics.

While the invention has been particularly shown and described in reference to preferred embodiments thereof, it will be understood by those skilled in the art that changes in form and details may be made therein without departing from the spirit and scope of the invention.

What is claimed is:

1. A method of reusing a slurry in a ground improving method whereby a hardening agent is injected into the ground, comprising the steps of:
    adding a substance having a permeability into said hardening agent to be injected;
    measuring a physical amount indicative of a permeability characteristic of said hardening agent added with said substance;
    calculating a quantity of the hardening agent from said physical amount;
    collecting said slurry which is discharged upon execution of the ground improving method;
    measuring the physical amount in said collected slurry and calculating a quantity of said collected hardening agent; and
    calculating a difference between an injection amount of said hardening agent which is needed to improve the ground and the quantity of said collected hardening agent and injecting said hardening agent with an amount corresponding to the difference.

* * * * *